US009776649B1

(12) United States Patent
Reynolds et al.

(10) Patent No.: US 9,776,649 B1
(45) Date of Patent: Oct. 3, 2017

(54) ADAPTIVE PENALTY BRAKING FOR LOCOMOTIVE AIR BRAKE SYSTEM

(71) Applicant: New York Air Brake, LLC, Watertown, NY (US)

(72) Inventors: John M. Reynolds, Carthage, NY (US); Erich Leonard, Clayton, NY (US); John W. LaDuc, Harrisville, NY (US); Konstantinos Vilaetis, Watertown, NY (US)

(73) Assignee: New York Air Brake, LLC, Watertown, NY (US)

( * ) Notice: Subject to any disclaimer, the term of this patent is extended or adjusted under 35 U.S.C. 154(b) by 0 days.

(21) Appl. No.: 15/079,720

(22) Filed: Mar. 24, 2016

(51) Int. Cl.
| | |
|---|---|
| *B60T 7/12* | (2006.01) |
| *B61H 13/00* | (2006.01) |
| *B61L 27/00* | (2006.01) |
| *B60T 8/17* | (2006.01) |
| *B61L 25/02* | (2006.01) |

(52) U.S. Cl.
CPC ........ *B61L 27/0038* (2013.01); *B60T 8/1705* (2013.01); *B61H 13/00* (2013.01); *B61L 25/021* (2013.01); *B60T 2270/40* (2013.01); *B61L 2201/00* (2013.01)

(58) Field of Classification Search
CPC .... B61L 27/0038; B60T 8/1705; B60T 15/02; B60T 13/66; B60T 7/12; B61H 13/00
USPC ........... 701/19.2, 97, 19, 20; 303/22.6, 14, 3
See application file for complete search history.

(56) References Cited

U.S. PATENT DOCUMENTS

| | | | |
|---|---|---|---|
| 9,415,756 B2 * | 8/2016 | Smith | |
| 9,545,907 B2 | 1/2017 | Rasel et al. | |
| 2009/0281705 A1 * | 11/2009 | Kernwein | B60T 17/221 701/97 |
| 2014/0180573 A1 * | 6/2014 | Rhea | B60T 13/665 701/411 |

OTHER PUBLICATIONS

International Search Report and Written Opinion Form PCT/ISA/220, International Application No. PCT/US2016/023970, p. 1-10, dated Dec. 8, 2016.

* cited by examiner

*Primary Examiner* — Tan Q Nguyen
(74) *Attorney, Agent, or Firm* — Bond Schoeneck and King PLLC; David Nocilly

(57) ABSTRACT

A locomotive air brake control system that responds to penalty braking requests from external systems by applying a varying amount of train brake level based on monitored and calculated parameters in order to enforce a defined train condition. The system may include a minimum acceptable train braking, a condition to be achieved to prevent further application of train brakes, and a maximum train brake level to be applied in response to the request. Alternatively, the system may apply braking in stepped levels according defined thresholds for a train behavior variable of interest such as speed or deceleration. The system may be configured to incrementally apply and release train brakes during the adaptive penalty, and may also adjust the level of braking according to calculated braking capacity of the train.

15 Claims, 6 Drawing Sheets

ADAPTIVE PENALTY BRAKING FOR LOCOMOTIVE AIR BRAKE SYSTEM

BACKGROUND OF THE INVENTION

1. Field of the Invention

The present invention relates to locomotive braking systems and, more particularly, to a system and method for applying safety override braking, referred to as penalty braking, in response to a request from an external safety system.

2. Description of the Related Art

Locomotive air brake systems control the brakes of the train by modulating the pressure in a compressed air pipe, called the "brake pipe," which runs continuously through the entire train. The brake pipe must be supplied with compressed air from the locomotive main supply reservoirs in order to release the train brakes, and reducing the pressure in the brake pipe causes the train brakes to apply. The air brake system allows the user to control the flow of compressed air into and out of the brake pipe to apply and release the train brakes. Some newer locomotive air brake control systems equipped with Electronically Controlled Pneumatic (ECP) brakes may alternately control the train braking level via electronically-generated commands that are distributed via electronic messaging communication throughout the train. Whether conventional brake pipe modulation or ECP control is used, the air brake system may also be configured to respond to an external safety system by applying the train brakes without any operator action. This automatic brake application is commonly referred to as penalty braking.

Current locomotive braking systems, whether electronic or pneumatic, generally emulate the function of pneumatic brake systems with respect to penalty braking. In these systems, the brake system responds to an electrical or pneumatic signal from the external safety system by reducing the brake pipe pressure to zero or to a fixed value. The brake system may also be configured to provide signals to the locomotive traction control system that indicates that the penalty brakes have been applied, so that power to the traction system and the dynamic brake system can be inhibited. In conventional locomotive braking systems equipped with penalty braking, the amount of braking that is triggered is static and constitutes a predetermined level of braking, which may even be the maximum brake application that is possible. Accordingly, there is a need in the art for a system that can apply an appropriate and varying amount of penalty braking in response to an external safety system.

BRIEF SUMMARY OF THE INVENTION

The present invention is a system for providing adaptive penalty braking in a train that has a controller that receives a signal from an external safety system requesting a penalty brake then causes the train braking system of the train to apply the train brakes. The controller is programmed to command the train braking system to apply a penalty brake at an initial train brake level in response to receipt of the penalty brake request and to command the train brake system to increase the train brake level a first predetermined amount above the initial train brake level based on a train behavior condition. In one embodiment, the controller is programmed to increase the train brake level a second predetermined amount based on the train behavior condition. The increases in train brake may be incremental increases in the train brake level or variable increases that are calculated based on a characteristic of the train, such as the current braking capability of the train. The train behavior condition may be a predetermined rate of deceleration of the train, a predetermined speed of the train, or another measurement of the response of the train to the penalty brake. The controller may also be programmed to increase the level of the penalty brake to predetermined levels based on corresponding train behavior conditions, e.g., a first behavior results in a first level, a second behavior results in a second level, etc. The controller may additionally be programmed to calculate the appropriate train brake level as the greater of a first level based on a first train behavior function and, optionally, a second level based on a second train behavior function, and then to increase or decrease the train brake level, either based on changes in the first and second behavior functions. The controller is also programmed to not increase the train brake level if it has reached a predetermined maximum train brake level and to check whether a train operator has suppressed the penalty brake prior to commanding that the train braking system apply the penalty brake. The controller is also programmed to check whether the external safety system has negated the penalty brake request.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
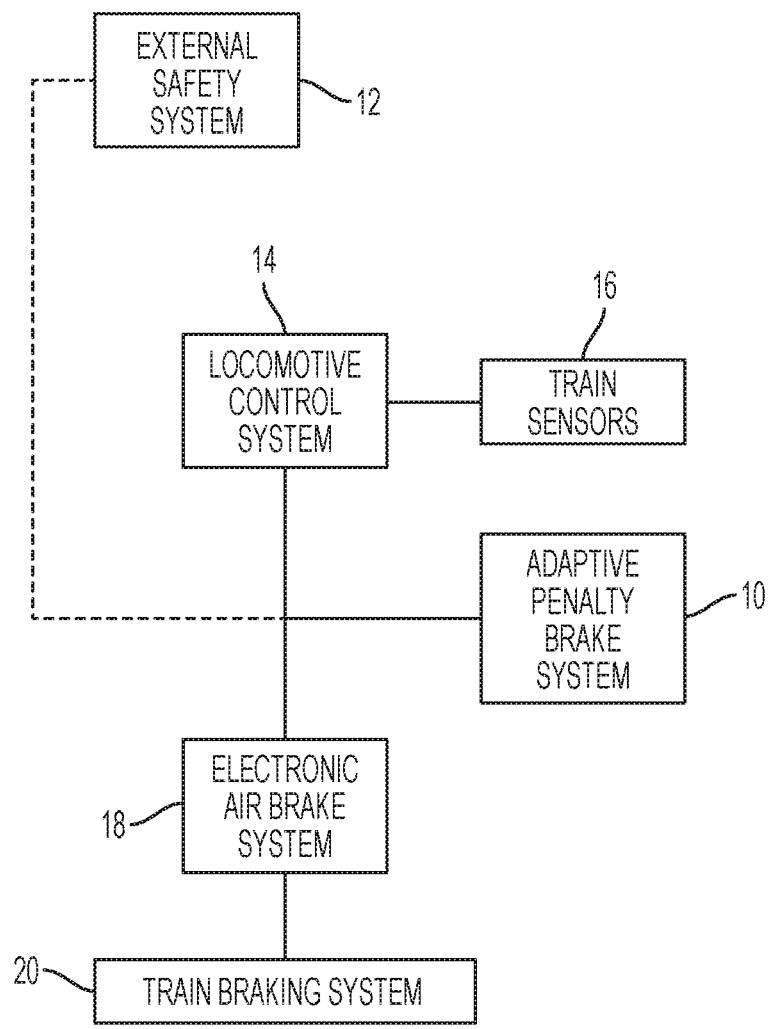
FIG. 1 is a schematic of an adaptive penalty braking system according to the present invention.

Referring now to the drawings, wherein like reference numerals refer to like parts throughout, there is seen in FIG. 1 an adaptive penalty brake system 10 that comprises a controller that can apply varying levels of train braking in response to a request from an external safety system 12 based on defined parameters as well as information available to adaptive penalty brake system 10. External safety system 12 may be an alertness system, a positive train control (PTC) system, overspeed control system, etc. Adaptive penalty brake system 10 is associated with a locomotive control system 14 having train sensors 16 that can collect data on the operation of the train and the electronic air brake (EAB) system 18 that operates the train braking system 20. In the embodiment shown in FIG. 1, locomotive control system 14 collects and provides sensor data to adaptive penalty braking system 10 and electronic air brake system 18. It should be recognized, however, that sensors 16 may report directly to adaptive penalty brake system 10 or to electronic air brake system 18. Similarly, external safety system 12 may report directly to any or all of adaptive penalty brake system 10, locomotive control system 14 and electronic air brake system 18. The functionality and logic of adaptive penalty brake system 10 as described herein is intended to be implemented by integrating directly into electronic air brake system 18 by programming the existing controllers, but could be similarly implemented by programming system 10 in a stand-alone fashion in a dedicated controller that is coupled or interconnected to electronic air brake system 18 or locomotive control system 14. Communications between the various modules seen in FIG. 1 may be accomplished via a dedicated communication link, discrete digital or analog signals, or existing train communication structures, including both wired and wireless systems, as is known in the art.

Adaptive penalty brake system 10 includes a minimum acceptable train braking level that is set as a pre-defined system parameter to establish the initial amount of train braking that adaptive penalty brake system 10 will apply upon initial receipt of a penalty braking request from external safety system 12. Adaptive penalty brake system 10 also includes defined system parameters and logic which can be configured to enforce train behavior conditions that must be satisfied to prevent the application of higher levels of train braking by adaptive penalty brake system 10. Adaptive penalty brake system 10 also includes a maximum acceptable train braking level that is set as a pre-defined system parameter to establish the maximum amount of train braking that will be applied in response to an external penalty brake request regardless of any monitored train behavior conditions. It should be noted that adaptive penalty brake system 10 does not affect the ability of the train operator to independently apply the brakes to higher levels than the automatically enforced braking at any time.

For example, adaptive penalty brake system 10 may receive an overspeed penalty brake request from external system 12 when the locomotive exceeds 75 mph. External system 12 will hold the request active until the train reaches 60 mph. In response to the request, adaptive penalty brake system 10 initially applies a 7 psi brake pipe reduction and adaptive penalty brake system 10 determines that the resulting train deceleration is greater than 1 mph/sec (as calculated by adaptive penalty brake system 10 based on available train speed information). As a result, the brake pipe reduction stays at 7 psi. By the time train speed slows to 65 mph, however, the wheels have heated such that the deceleration of the train measured by adaptive penalty brake system 10 slows below a predetermined threshold, e.g., the 1 mph/sec indicated above. Adaptive penalty brake system 10 may then make a further brake pipe reduction, such as 12 psi, so that the measured deceleration is again above the predetermined threshold (and stays below the threshold) until the train slows to 60 mph. At this point, the penalty request is negated by external safety system 12 and no further train braking is applied, i.e., brake pipe pressure may be restored to the appropriate level such as by prompting the operator to take action to regain normal brake control.

Adaptive penalty brake system 10 may also be configured to apply a defined amount of penalty braking if one defined speed threshold is exceeded, a greater amount of penalty braking if a defined higher threshold of speed is exceeded, and an emergency brake if a maximum defined speed is exceeded. The speed thresholds to be enforced may also be changed dynamically based on the territory, track condition, or other parameters, and communicated to the air brake system via a communication link or other signal.

Adaptive penalty brake system 10 may also be configured to both incrementally apply and incrementally release the train braking level as needed to achieve train operation within a defined range of parameters. For example, the train brake could be gradually increased to achieve a defined deceleration parameter. Then, if the train deceleration becomes higher than another defined deceleration parameter, the train brake could be incrementally released by the adaptive penalty brake system 10 in order to keep deceleration within the defined range.

Adaptive penalty brake system 10 may also incorporate logic to modify the behavior of the adaptive braking algorithm based on the calculated and/or monitored state of readiness of the train brake system to apply brakes. Pneumatic train brakes require stored compressed air to apply the braking force to the individual car wheels. Adaptive penalty brake system 10 can calculate the amount of stored compressed air in the train based on the brake applications and releases that have occurred, and also based on the monitored rate of flow of compressed air into the train brake pipe during a brake release. Adaptive penalty brake system 10 can then use this information to change the braking profile. For example, if adaptive penalty brake system 10 calculates that the amount of stored, compressed air in the train is insufficient to apply the desired braking force in response to a standard brake command, it can automatically command a higher brake application or an emergency brake, depending the amount of the discrepancy.

For example, a brake system of FIG. 1 that is operating in normal operation may be parked with brake pipe pressure at 64 psi to apply a full service brake. Air flow is zero, indicating minimal train leakage. The operator releases the train brake via the brake handle, initiating a charge of the brake pipe pressure to 90 psi. Adaptive penalty brake system 10 monitors the flow of compressed air into the brake pipe and calculates the average level of charge of compressed air in the train brake reservoirs, either by knowing the total volume of car brake reservoirs (based on train length communicated from the train energy management system and multiplication by the average brake reservoir size) or by applying a safe average value of total train volume. The operator begins to move the train when the flow has reduced to 60 SCFM (as allowed by governmental train operating rules). If, a short time later, the train maximum speed is exceeded, external safety system 12 will request a penalty brake application by adaptive penalty brake system 10. Adaptive penalty brake system 10 determines that the flow rate has only reduced to 50 SCFM and thus calculates that the train brake reservoirs are only charged to an average value to 84 psi. Adaptive penalty brake system 10 can then apply an appropriate correction factor to the braking parameters, adding 6 psi to each defined braking level to insure that brake pipe is reduced by an additional 6 psi beyond the defined nominal in order to achieve the desired braking power in the same manner as if the train were fully charged.

Figure 2:
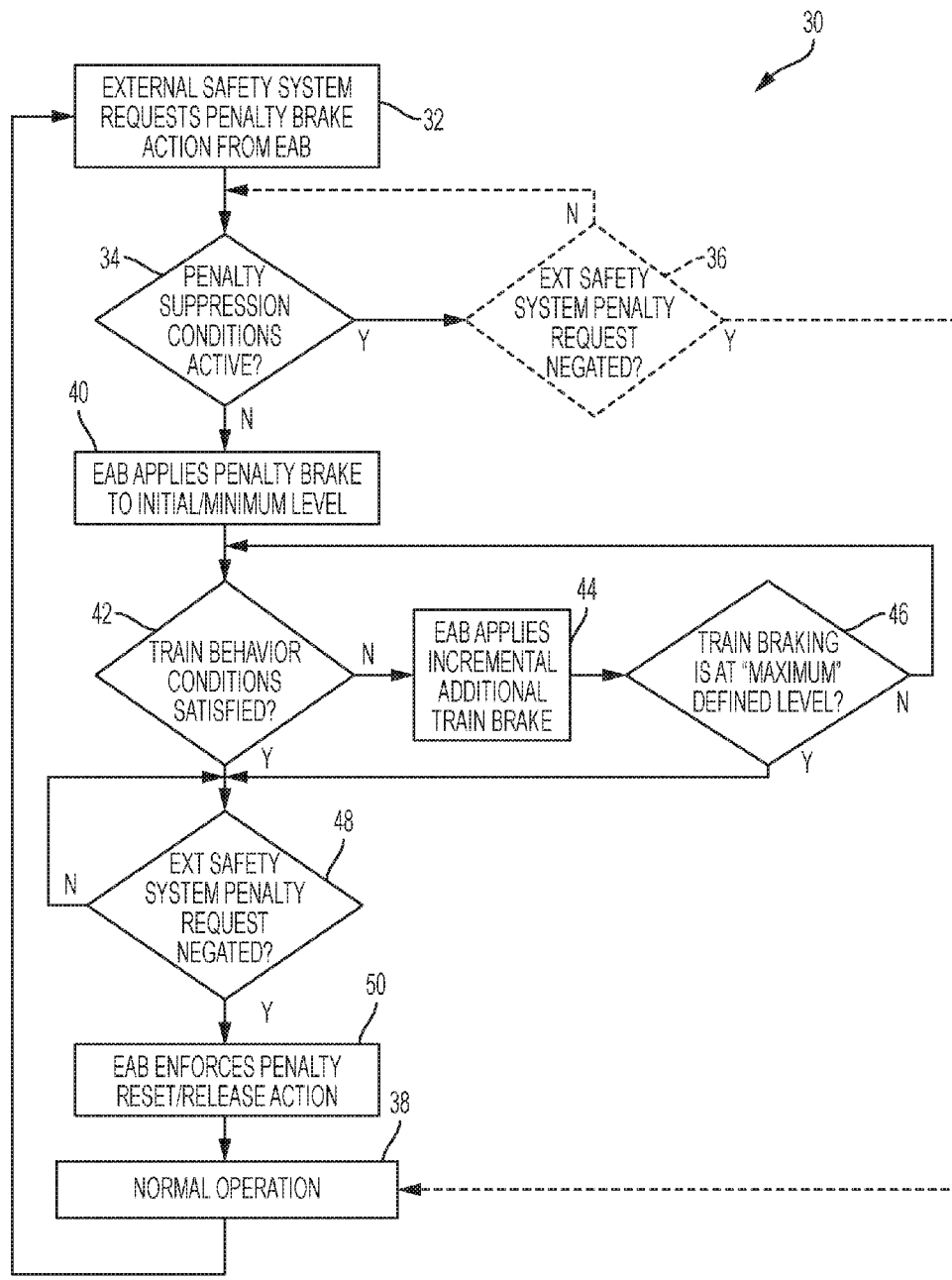
FIG. 2 is a flowchart of an embodiment of a method of providing adaptive penalty braking according to the present invention.

Referring to FIG. 2, adaptive penalty brake system 10 may implement a method 30 where a penalty brake application may be suppressed by EAB 18. More specifically, an external safety system first requests a penalty brake action 32 from the EAB 18. A check 34 is then performed to determine whether penalty suppression conditions are active as more fully described below. If suppression conditions are active, a check 36 is performed to determine whether the external safety system penalty request has been negated. If not, control returns to check 34. If so, adaptive penalty brake system 10 allows the train to exhibit normal operation 38. If suppression conditions are not active at check 34, EAB 18 applies the penalty brake to the predetermined initial/minimum level 40. A check 42 is then performed to determine whether the train behavior conditions have been satisfied. If not, EAB 18 applies incremental additional train braking 44. A check 46 is made to determine whether the train braking has reached a maximum level. If not, control returns to check 42. If so, or if check 42 determines that train behaviors conditions are satisfied, a check 48 is performed to determine whether the external safety system penalty request has been negated. If not, check 48 is repeated until check 48 determines that the external safety system penalty request has been negated. When that occurs, EAB 18 enforces a penalty reset and the brakes are released 50. The train then exhibits normal operation 38 until external safety system requests a penalty brake action from EAB 18.

In FIG. 2, EAB 18 is in "normal operation" braking based on the brake handle commands of the operator until external safety system 12 detects a condition that warrants braking the train and requests that the electronic air brake apply a penalty brake action. The penalty request may be a discrete electrical signal, pneumatic signal, or electronic communication as in known in the art. Upon receipt of the penalty braking request, the electronic air brake system will evaluate whether the penalty brake should be suppressed (prevented) based on defined internal logic. This internal logic may include handle position, cylinder pressure level, or other parameter per the prior art. When the penalty request is true/active and the suppression conditions are false/inactive, the electronic air brake will enter the penalty applied state. In the embodiment of FIG. 2, adaptive penalty brake system 10 will, upon first entering the penalty applied state, apply a level of braking defined as the initial/minimum level. This first level of braking is a system parameter, which may be designed into the system as a constant, or may be a persistent or dynamic parameter residing in memory and defined during software compile or defined in operation via communication or other means. The initial/minimum level of train braking may be applied by reducing the brake pipe pressure by a defined amount for a conventional train, or by applying a defined percentage of train brake effort for an electronically controlled pneumatic (ECP) train. After the initial/minimum level of train braking is applied, adaptive penalty brake system 10 monitors the train behavior condition to see if the desired minimum level has been achieved. Whenever the desired minimum level of train behavior has been achieved, adaptive penalty brake system 10 stops the further incremental application of train brake. Whenever the desired train behavior is not achieved, adaptive penalty brake system 10 resumes applying incrementally more train brake until the defined maximum train braking is achieved, after which adaptive penalty brake system 10 will apply no additional braking. As in a conventional system, adaptive penalty brake system 10 will continue to honor operator requests for additional brake via the brake handles regardless of the defined maximum for the adaptive penalty. Whenever the incremental application of additional braking is stopped, whether due to reaching the defined maximum or due to satisfying the desired train behavior condition, adaptive penalty brake system 10 will check whether the external safety system has removed the penalty request. When the penalty request is removed, adaptive penalty brake system 10 will enforce normal actions to exit the penalty state and return to normal operation.

The "train behavior condition" referenced in FIG. 2 and throughout is a system parameter that may be designed into the system as a constant, or may be a persistent or dynamic parameter residing in memory and defined during a software compile or via communications or other means. The parameter may be either directly monitored by adaptive penalty brake system 10 via attached sensors, or calculated by adaptive penalty brake system 10 based on attached sensors, or monitored or calculated based on data communicated to adaptive penalty brake system 10 via interfaced systems, such as locomotive computers or energy management systems like the LEADER® train control system available from New York Air Brake, LLC of Watertown, N.Y. An example of a monitored parameter would be train speed, which could be monitored directly via the locomotive brake system wheel slip prevention subsystem or communicated to adaptive penalty brake system 10 from the locomotive computer. An example of a calculated parameter is train deceleration, which may be calculated based on continuous monitoring of train speed. It should be recognized that various monitored or calculated parameters may be used as the train behavior condition on which the application of the penalty brake by adaptive penalty brake system 10 makes its decisions.

Figure 3:
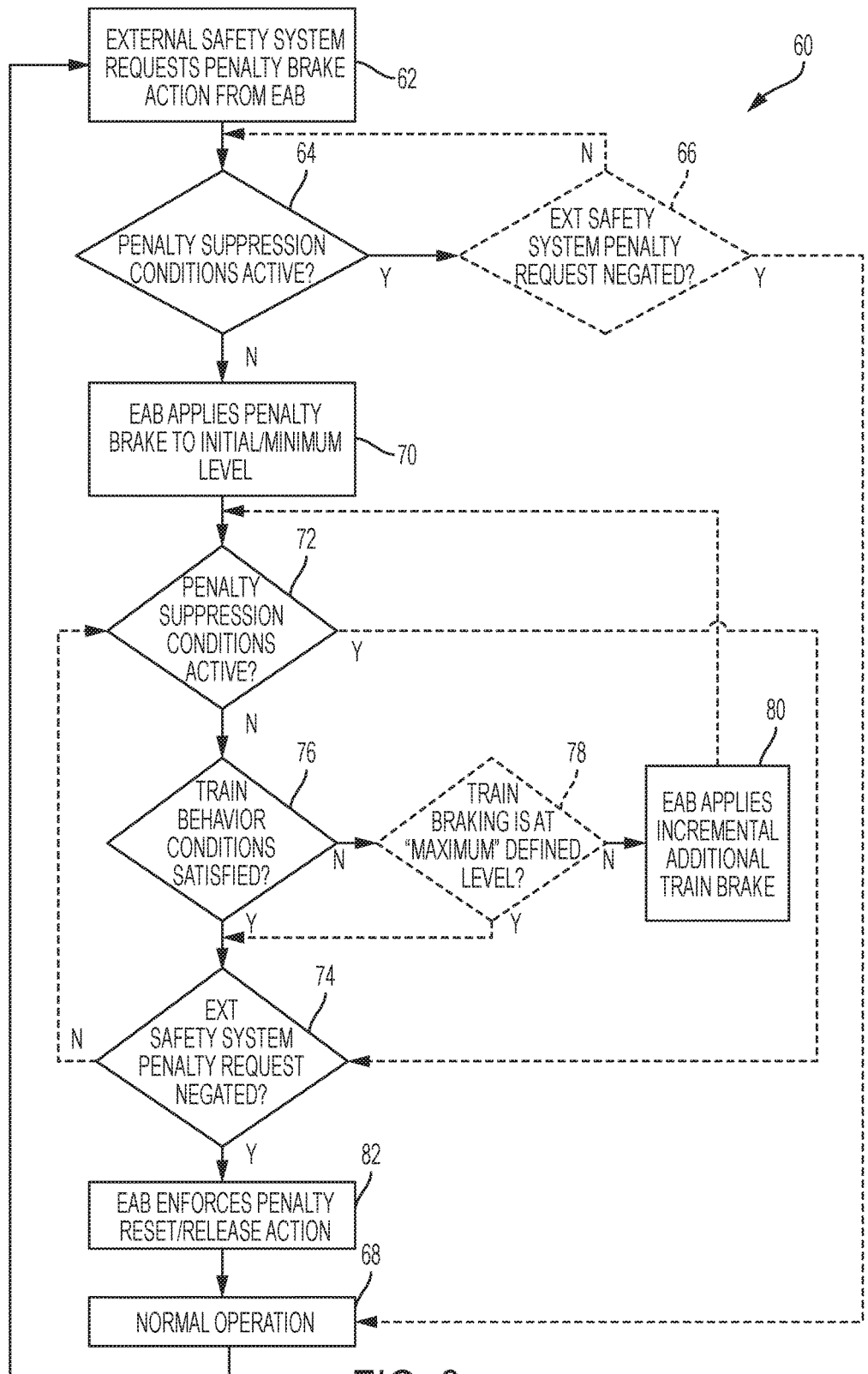
FIG. 3 is a flowchart of another embodiment of a method of providing adaptive penalty braking according to the present invention.

Referring to FIG. 3, adaptive penalty brake system 10 may implement a method 60 where suppression of a penalty brake application is evaluated every time the brake application is paused. First, an external safety system requests a penalty brake action 62 from the EAB 18. A check 64 is then performed to determine whether penalty suppression conditions are active, e.g., the operator has manually suppressed or cancelled penalty braking. If suppression conditions are active, a check 66 is performed to determine whether the external safety system penalty request has been negated. If not, control returns to check 64. If so, adaptive penalty brake system 10 allows the train to exhibit normal operation 68. If suppression conditions are not active at check 64, the EAB applies the penalty brake to the predetermined initial/minimum level 70. A second check 72 is then performed to determine whether penalty suppression conditions are active and, if so, a check 74 is performed to determine whether the external safety system penalty request has been negated. If check 72 reveals that penalty suppression conditions are not active, a check 76 is performed to determine whether the train behavior conditions have been satisfied. If so, control passes to check 74. If not, check 78 is performed to determine whether train braking is at a predetermined maximum level and, if not, EAB 18 applies incremental additional train braking and control returns to check 72. If check 78 determines that train braking has reached a predetermined maximum level, control passes to check 74. If check 74 determines that the external safety system penalty request has been negated, EAB 18 enforces a penalty reset and the brakes are released 82, either automatically or the operator is allowed to release the brakes in the convention manner. The train then exhibits normal operation 68 until external safety system requests a penalty brake action from EAB 18.

The method seen in FIG. 3 is thus similar to FIG. 2, but with a difference in the penalty suppression methodology. Whereas method 30 seen in FIG. 2 evaluates suppression conditions only upon entry to the penalty state, in method 60 seen in FIG. 3 the penalty state may be suppressed from further application at any time that the brake system is not incrementally changing the braking level. In method 60, any time the train behavior condition or conditions are satisfied, and thus the decision evaluates as true, adaptive penalty brake system 10 will check to see if the suppression conditions have also become true. If they have, then adaptive penalty brake system 10 will apply no further incremental train brake and will enforce the level of train braking achieved to that point until the penalty request is removed by the external safety system. Thereafter, penalty reset and return to normal operation are the same as the system in FIG. 2.

Figure 4:
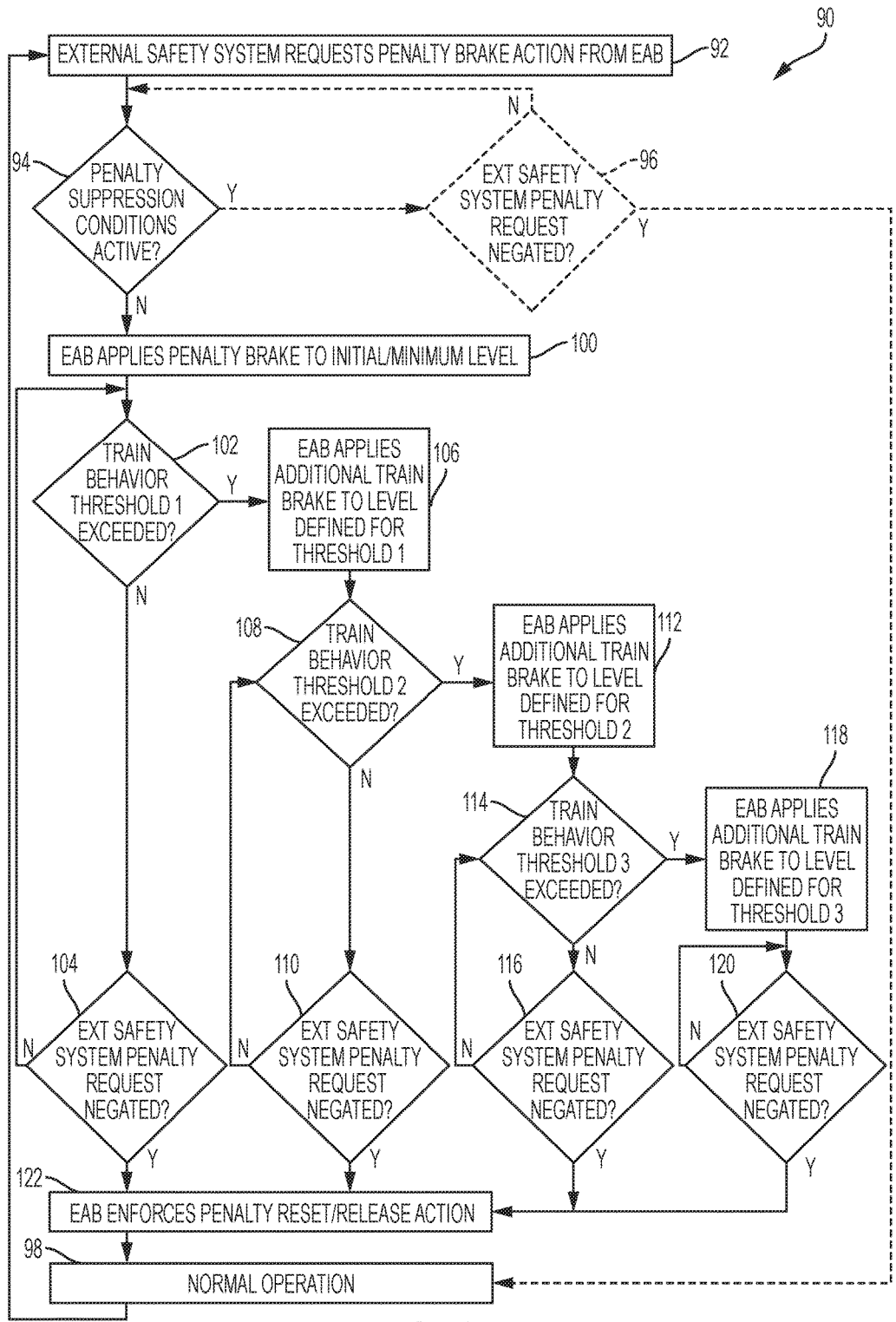
FIG. 4 is a flowchart of an additional embodiment of a method of providing adaptive penalty braking according to the present invention.

Referring to FIG. 4, adaptive penalty brake system 10 may implement a method 90 where a stepped adaptive penalty brake application is made by EAB 18 based on defined thresholds of a train behavior variable. First, an external safety system requests a penalty brake action 92 from EAB 18. A check 94 is then performed to determine whether penalty suppression conditions are active. If suppression conditions are active, a check 96 is performed to determine whether the external safety system penalty request has been negated. If not, control returns to check 94. If so, adaptive penalty brake system 10 allows the train to exhibit normal operation 98. If suppression conditions are not active at check 94, EAB 18 applies the penalty brake to the predetermined initial/minimum level 100. Next, a check 102 is performed to determine whether a first train behavior threshold has been exceeded. If not, a check 104 is performed to determine whether the external safety system penalty request has been negated. If the threshold is exceeded at check 102, EAB 18 applies additional train braking to a level that has been pre-associated with the first train behavior threshold 106. Another check 108 is then performed to determine whether a second train behavior threshold has been exceeded. If not, a check 110 is performed to determine whether the external safety system penalty request has been negated and, if not, control returns to check 108. If check 108 reveals that the second threshold has been exceeded, EAB 18 applies additional train braking to a level pre-associated with the second train behavior threshold 112. A third check 114 is then performed to determine whether a third threshold has been exceeded. If not, a check 116 is performed to determine whether the external safety system penalty request has been negated. If check 114 reveals that the third threshold has been exceeded, EAB 18 applies additional train braking to a level pre-associated with the third train behavior threshold 118. A check 120 is then performed to determine whether the external safety system penalty request has been negated. If not, check 120 is repeated until external system penalty request is negated. If any of check 104, check 110, check 116, or check 120 reveals that the external safety system penalty request has been negated, EAB 18 enforces a penalty reset and the brakes are released 122, either automatically or the operator is allowed to release the brakes in the conventional manner. The train then exhibits normal operation 98 until external safety system requests a penalty brake action.

Method 90 of FIG. 4 thus represents an embodiment with defined braking steps, rather than the continuously incremental approaches of FIGS. 2 and 3. Method 90 of FIG. 4 achieves the penalty state in the same way by initially applying the train braking to the initial/minimum level. However, method 90 has any number of additional levels of braking ("1" to "n") that are mapped to corresponding levels of train behavior. The levels/thresholds of train behavior and the stepped braking levels depicted in FIG. 4 may be established as system parameters that are designed into adaptive penalty brake system 10 as constants. Alternatively, the stepped levels may be persistent or dynamic parameters residing in memory and defined during software compile, or defined during operation of adaptive penalty brake system 10 via external communications or other means. After applying an initial/minimum level of train braking, adaptive penalty brake system 10 then monitors or calculates the defined train behavior and applies the level of train braking corresponding to the monitored/calculated threshold. As depicted in FIG. 4, adaptive penalty brake system 10 will continue to evaluate the train braking level compared to the train behavior, and will apply the next greater level of braking whenever an incremental threshold is exceeded until the penalty request is negated by the external safety system. When the penalty request is removed, EAB 18 enforces the penalty reset and return to normal operation by usual logic.

Figure 5:
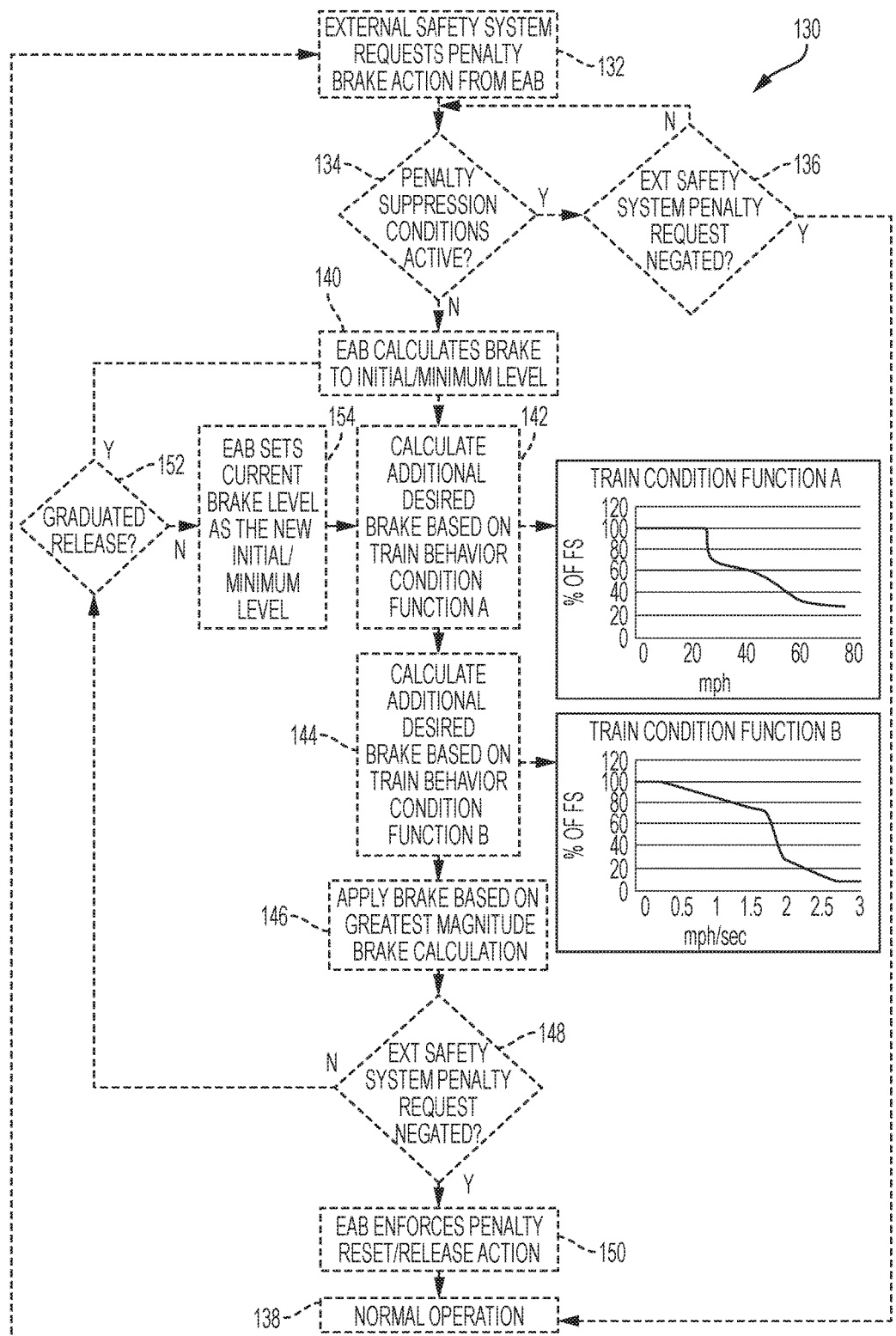
FIG. 5 is a flowchart of a further embodiment of a method of providing adaptive penalty braking according to the present invention.

Referring to FIG. 5, adaptive penalty brake system 10 may implement a method 130 where adaptive penalty braking according to the present invention is based on one or more continuous train performance curves. First, an external safety system requests a penalty brake action 132 from the EAB 18. A check 134 is then performed to determine whether penalty suppression conditions are active. If suppression conditions are active, a check 136 is performed to determine whether the external safety system penalty request has been negated. If not, control returns to check 134. If so, adaptive penalty brake system 10 allows the train to exhibit normal operation 138. If suppression conditions are not active at check 134, EAB 18 applies the penalty brake to the predetermined initial/minimum level 140. Next, adaptive penalty brake system 10 calculates any additional desired braking based on train behavior function A 142, illustrated in FIG. 5 as miles per hour (mph) verses percent of full service braking (% of FS). Adaptive penalty brake system 10 then calculates any additional desired braking based on train behavior function B 144, illustrated in FIG. 5 as miles per hour over seconds (mph/sec) verses percent of full service braking (% of FS). Adaptive penalty brake system 10 then applies the brakes 146 based on the greatest magnitude brake calculation of step 142 and step 144 so that the applied brake effort is the maximum possible based on the two functions. It should be recognized that more than two functions may be used. A check 148 is then performed to determine the external safety system penalty request has been negated. If so, EAB 18 enforces a penalty reset and the brakes are released 150, either automatically or the operator is allowed to release the brakes in the conventional manner. The train then exhibits normal operation 138 until external safety system requests another penalty brake action from EAB 18 at step 132. If check 148 determines that the external safety system penalty request has not been negated, a check 152 is performed to determine whether to perform a graduated release of the brakes (whether or not system 10 is otherwise configured to allow a graduated release of the brakes). If not, EAB 18 sets the current brake level as the new initial/minimum level 154 and control returns to step 142. If so, control passes to step 140.

Method 130 of FIG. 5 thus represents an embodiment of adaptive penalty brake system 10 with one or more transfer functions that calculate a desired train braking level based on a train behavior variable. FIG. 5 illustrates two train condition functions, which are depicted as graphs of the transfer functions. Adaptive penalty brake system 10 enters the penalty state in the same way as discussed above, but does not apply a minimum braking level and recheck train behavior. Instead, method 130 first calculates the minimum braking level, and then selects the greater of a brake level based on the transfer function "A" and a train brake level based on transfer function "B." The train condition functions are transfer functions of defined train behavior variables verses train brake level, which may be designed into adaptive penalty brake system 10 as constants. Alternatively, the train condition functions may be persistent or dynamic parameters residing in memory and defined during software compile, or defined during operation of adaptive penalty brake system 10 via external communications or other means. After applying the maximum of the calculated levels of train braking, adaptive penalty brake system 10 then checks to see if there is still an active penalty brake request active. If the request is negated, adaptive penalty brake system 10 enforces penalty brake reset in the usual manner. If the request is not negated, the system loops back for recalculation. If adaptive penalty brake system 10 is graduated release enabled, the system returns to the initial calculation point, allowing the next brake calculation to either increase or decrease based on the changes in the train behavior variables used in the train condition functions. If the system is not graduated release enabled, then the current achieved train brake is set as the new minimum before the algorithm calculates the new braking level based on the train condition functions, and in that way does not allow the train brake level to decrease until the penalty request is negated and the penalty brake is reset. When the penalty request is removed, adaptive penalty brake system 10 enforces the penalty reset and return to normal operation by usual logic.

Figure 6:
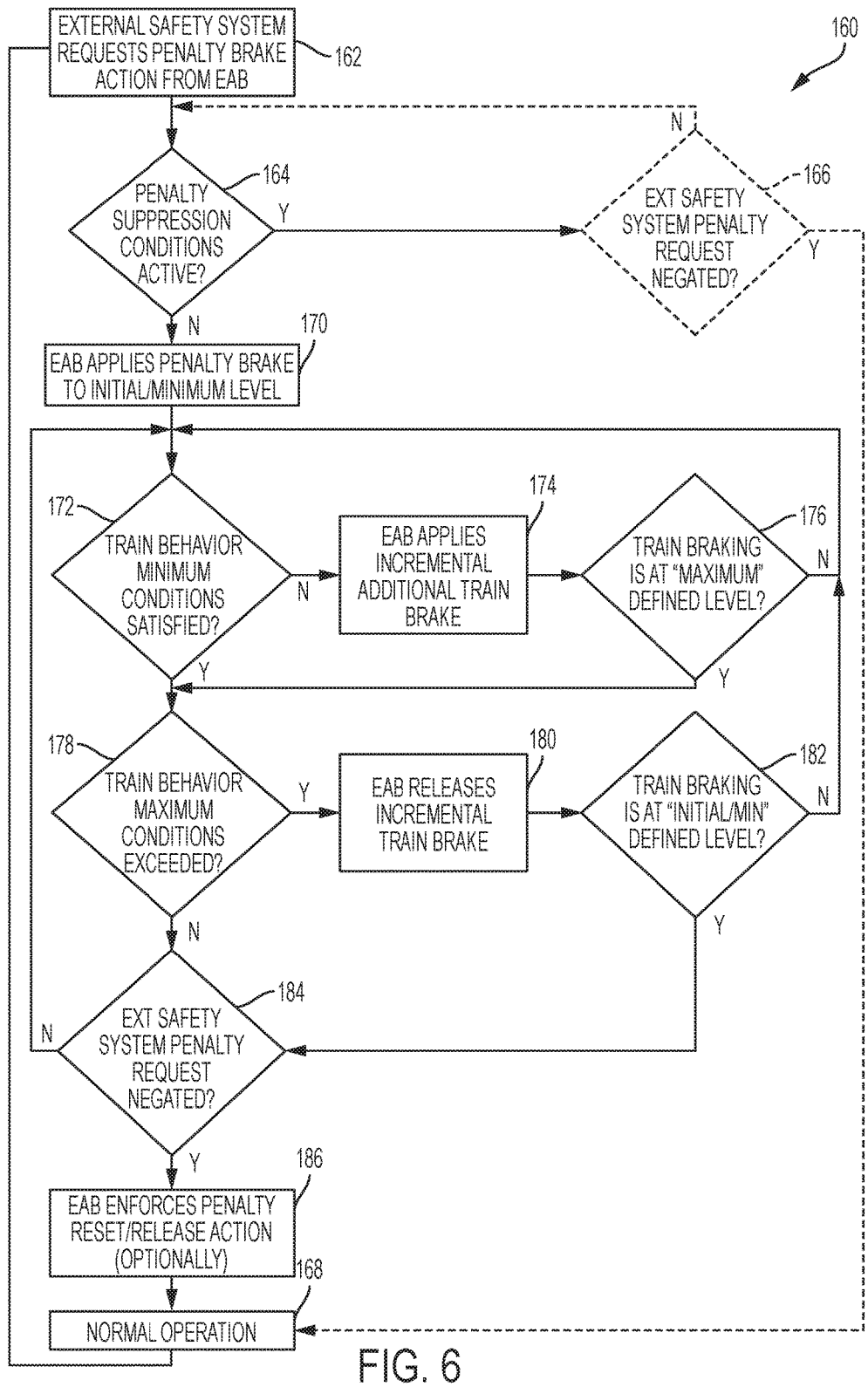
FIG. 6 is a flowchart of yet another embodiment of a method of providing adaptive penalty braking according to the present invention.

Referring to FIG. 6, adaptive penalty brake system 10 may implement a method 160 where the penalty brake can be both applied and released incrementally to maintain a train behavior variable within a defined minimum and maximum value. First, an external safety system requests a penalty brake action 162 from EAB 18. A check 164 is then performed to determine whether penalty suppression conditions are active. If suppression conditions are active, a check 166 is performed to determine whether the external safety system penalty request has been negated. If not, control returns to check 164. If so, adaptive penalty brake system 10 allows the train to exhibit normal operation 168. If suppression conditions are not active at check 164, EAB 18 applies the penalty brake to the predetermined initial/minimum level 170. Next, a check 172 is performed to determine whether train behavior minimum conditions are satisfied. If not, EAB 18 applies incremental additions to the train brake 174. A check 176 is then performed to determine whether train braking has reached a predetermined maximum. If not, control returns to check 172. If so, or if check 172 determines that train behavior minimum conditions are satisfied, a check 178 is performed to determine whether train behavior maximum conditions are exceeded. If so, EAB 18 performs an incremental release of the train brake 180. A check 182 is then performed to determine whether train braking is at a predetermined initial/minimum level. If not, control returns to check 172. If so, or if check 178 determines that train behavior maximum conditions have not been exceeded, a check 184 is performed to determine whether the external safety system penalty request has been negated. If not, control passes to check 172. If so, EAB 18 enforces a penalty reset and the brakes are released 186, either automatically or the operator is allowed to release the brakes in the conventional manner. The train then exhibits normal operation 168 until external safety system requests another penalty brake action from EAB 18.

Method 160 of FIG. 6 thus involves a graduated release embodiment. Adaptive penalty brake system 10 will both apply and release the train brake to maintain the train behavior within a minimum and maximum set of values. This embodiment is similar to that seen in FIG. 2, except adaptive penalty brake system 10 can also incrementally release the train brake without an operator reset of the penalty brake via check 178 of FIG. 6. When evaluated as "true," adaptive penalty brake system 10 incrementally releases the train brake to a lower level until the train behavior is once again between the minimum and maximum behavior values.

Adaptive penalty brake system 10 may modify any of the parameters used in FIGS. 2 through 6 based on internal logic that calculates the braking capacity of the train. For example, adaptive penalty brake system 10 may modify the parameters to increase the train braking level if adaptive penalty brake system 10 determines that the train braking capacity is less than 100% charged. This approach is particularly important for trains that are braked by reducing the train brake pipe pressure to cause air to flow from the compressed air storage reservoirs into the brake cylinders of the individual rail cars. Adaptive penalty brake system 10 may also monitor brake pipe pressure as well as the flow rate of compressed air from main reservoir into the brake pipe to calculate the level of charge of the compressed air storage reservoirs of the rail cars. When available, adaptive penalty brake system 10 may also use additional parameters to further refine the accuracy of this calculation, such as train length (which may be communicated to adaptive penalty brake system 10 from the train energy management system). When adaptive penalty brake system 10 calculates that reservoirs of the tail cars are not fully charged, it can modify the "minimum/initial" train braking level and all other parameters to command a larger reduction of brake pipe than the unmodified nominal value to ensure that an effective train brake is applied in response to the penalty brake request.

As described above, the present invention may be a system, a method, and/or a computer program product and is described herein with reference to flowcharts and block diagrams of methods, apparatus (systems). The flowchart and block diagrams illustrate the architecture, functionality, and operation of possible implementations of systems, methods, and computer program products of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part of (or all of) one of more of the blocks illustrated in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for providing adaptive penalty braking in a train, comprising:
   a controller having an interface for receiving a signal from an external safety system requesting a penalty brake and an interface for sending a penalty brake command to a train braking system having a set of train brakes that will cause the train braking system to apply the train brakes;
   wherein the controller is programmed to command the train braking system to apply a penalty brake at an initial train brake level in response to receipt of the penalty brake request and to command an increase in initial train brake level of the penalty brake based on a train behavior condition.

2. The system of claim 1, wherein the increase is a predetermined incremental increase and the controller is programmed to repeat the incremental increase if the penalty brake has not satisfied the train behavior condition.

3. The system of claim 2, wherein the controller is programmed to command an additional increase in the penalty brake based on the train behavior condition.

4. The system of claim 2, wherein the increase is a variable increase dependent on a characteristic of the train.

5. The system of claim 4, wherein the characteristic of the train comprises the readiness of the train braking system.

6. The system of claim 2, wherein the controller is programmed to not command an increase in the penalty brake if a predetermined maximum brake level has been reached.

7. The system of claim 1, wherein the increase in the penalty brake is to a first train brake level based on a first predetermined train behavior condition.

8. The system of claim 7, wherein the increase in the penalty brake is to a second train brake level based a second predetermined train behavior condition.

9. The system of claim 8, wherein the increase in the penalty brake is to a third train brake level based a third predetermined train behavior condition.

10. The system of claim 1, wherein the increase in the penalty brake is determined as the greater of a first level based on a first train behavior function and a second level based on a second train behavior function.

11. The system of claim 1, wherein the controller is programmed to decrease the train brake level based on the train behavior condition.

12. The system of claim 1, wherein the controller is programmed to check whether the penalty brake should be suppressed prior to commanding the application of the penalty brake and prior to commanding an increase in the train brake level of the penalty brake.

13. The system of claim 12, wherein the controller is programmed to check whether the external safety system has negated the penalty brake request and, if so, to command cancellation of the penalty brake.

14. The system of claim 1, wherein the train behavior condition comprises a predetermined rate of deceleration of the train.

15. The system of claim 1, wherein the train behavior condition comprises a predetermined speed of the train.

* * * * *